United States Patent [19]

Djordjevic et al.

[11] Patent Number: 5,223,276
[45] Date of Patent: Jun. 29, 1993

[54] MULTILAYER COEXTRUSION APPARATUS

[75] Inventors: Dragan Djordjevic; Dieter Jung, both of Erkrath, Fed. Rep. of Germany

[73] Assignee: ER-WE-PA Machinenfabrik GmbH, Erkrath, Fed. Rep. of Germany

[21] Appl. No.: 678,369

[22] PCT Filed: Aug. 29, 1990

[86] PCT No.: PCT/EP90/01436

§ 371 Date: Apr. 29, 1991

§ 102(e) Date: Apr. 29, 1991

[87] PCT Pub. No.: WO91/03365

PCT Pub. Date: Mar. 21, 1991

[30] Foreign Application Priority Data

Sep. 1, 1989 [DE] Fed. Rep. of Germany ....... 3929002

[51] Int. Cl.⁵ .............................................. B29C 47/06
[52] U.S. Cl. ................................. 425/131.1; 264/171; 425/133.5; 425/190; 425/382.4; 425/462
[58] Field of Search ................... 264/171, 176.1, 241; 425/131.1, 133.5, 141, 190, 197, 462, 376.1, 382.4, 461, 466, DIG. 49

[56] References Cited

U.S. PATENT DOCUMENTS

| | | | |
|---|---|---|---|
| 3,315,306 | 4/1967 | Ladner et al. | 425/133.5 |
| 3,531,828 | 10/1970 | Nauta | 425/131.1 |
| 3,687,589 | 8/1972 | Schrenk | 425/131.1 |
| 3,770,357 | 11/1973 | Gibney | 425/131.1 |
| 3,825,644 | 7/1974 | Hoagland et al. | 264/171 |
| 3,860,036 | 1/1975 | Newman, Jr. | 425/197 |
| 3,887,322 | 6/1975 | Johnson et al. | 425/466 |
| 3,924,990 | 12/1975 | Schrenk | 425/131.1 |
| 4,100,237 | 7/1978 | Wiley | 264/171 |
| 4,144,011 | 3/1979 | Sponaugle | 425/461 |
| 4,465,449 | 8/1984 | Hornbeck | 425/131.1 |
| 4,579,696 | 4/1986 | Di Luccio | 264/171 |
| 4,619,802 | 10/1986 | Cloeren | 425/382.4 |
| 4,669,965 | 6/1987 | Murakami | 264/171 |
| 4,731,004 | 3/1988 | Wenz, Jr. | 425/133.5 |
| 4,756,858 | 7/1988 | Reifehauser et al. | 425/131.1 |
| 4,839,131 | 6/1989 | Cloeren | 425/133.5 |
| 4,880,370 | 11/1989 | Krumm | 425/133.5 |

FOREIGN PATENT DOCUMENTS 62-240525 10/1987 Japan ............................... 425/131.1

*Primary Examiner*—Scott Bushey
*Attorney, Agent, or Firm*—Watson, Cole, Grindle & Watson

[57] ABSTRACT

A coextrusion apparatus for producing a multilayer film or sheet of diverse thermoplastic materials has a slit die and a feedblock assembly integrated into the die. The assembly includes a removable feedblock received within a cavity of the die and has a plurality of slotted, layer distribution passages opening into a coathanger-type expansion chamber via a shallow entrance section. The passages are mutually spaced apart and lie parallel to the slotted outlet of the die.

8 Claims, 3 Drawing Sheets

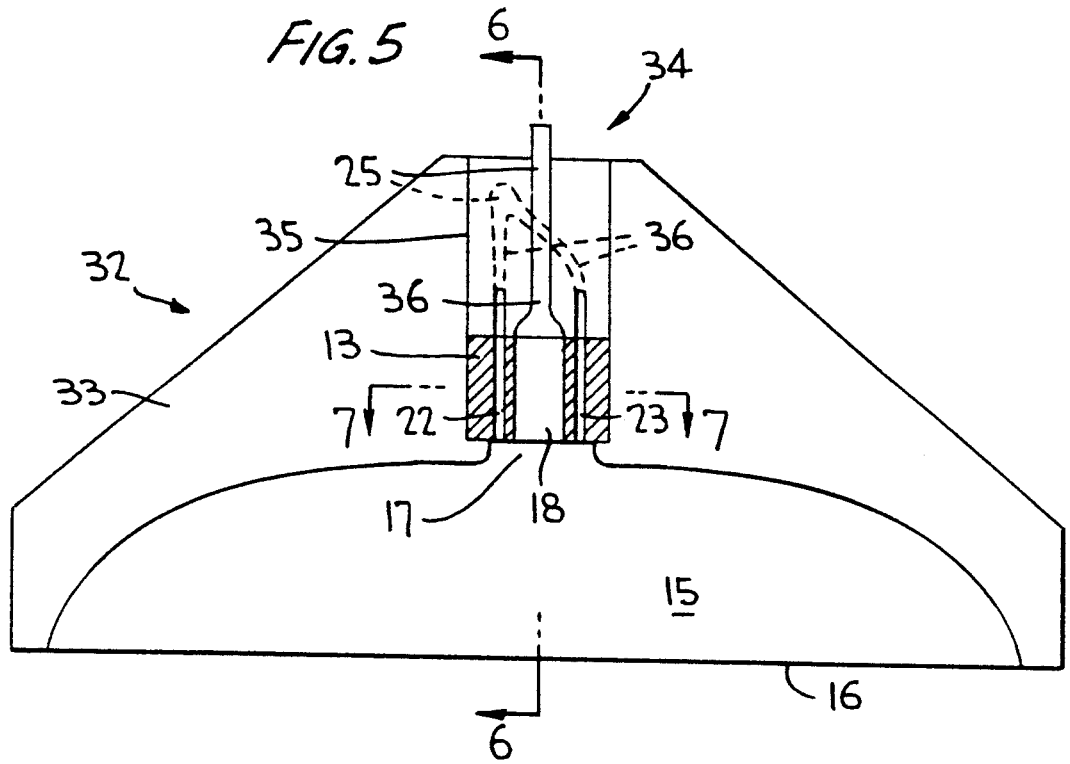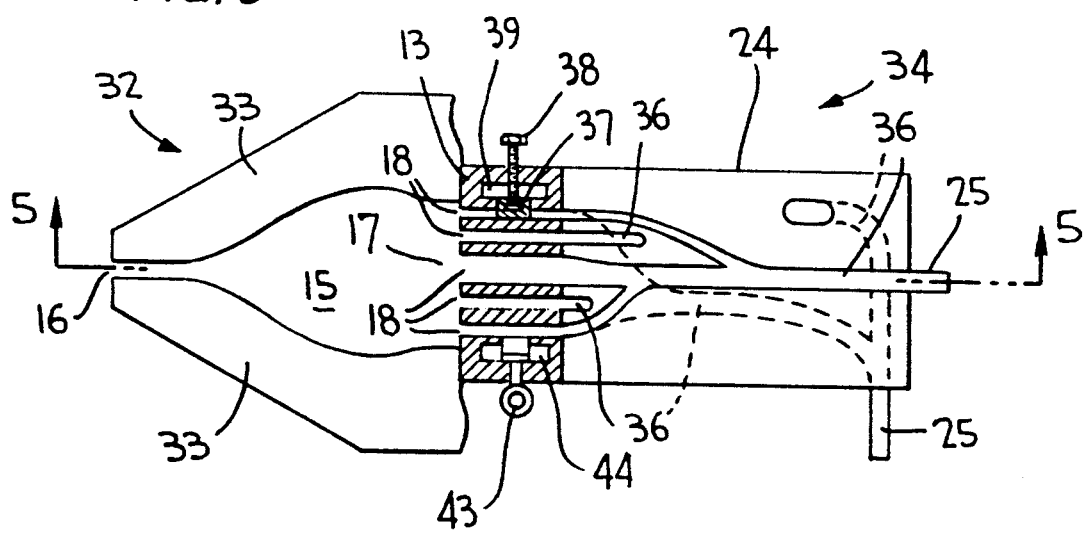

MULTILAYER COEXTRUSION APPARATUS

BACKGROUND OF THE INVENTION

This invention relates generally to a coextrusion apparatus for producing a multilayer film or sheet of diverse thermoplastic materials. The apparatus includes a slit die having a slotted die opening through which the materials are extruded as a multilayer film or sheet. The die has a coathanger-type expansion chamber.

A feedblock assembly is incorporated into the die, the assembly including feed lines for conveying thermoplastic melt streams from the extruders to the feedblock inlet for forming a multilayer film or sheet as the layers combine upon exiting the feedblock, expand transversely in the chamber and extrude through the die opening.

More particularly, the invention relates to such coextrusion apparatus in which the die has a cavity for the reception of a feedblock formed as part of the feedblock assembly such that combining of the layers upon exiting the feedblock takes place within the die itself and is close as possible to the entrance to the expansion chamber. The feedblock comprises a plurality of slotted, layer distribution passages opening into the expansion chamber via a shallow entrance section, the passages comprising mutually spaced apart openings lying parallel to the slotted die opening. And, the feedblock is replaceable to accommodate selected polymer match-ups, different numbers of multilayers, changes in layer thickness, layer geometry, etc.

Moreover, the invention provides for a highly effective end encapsulation of the multilayer film or sheet, and includes external adjustment to control the thickness, profile and distribution of the skin layers.

Coextrusion systems for forming multilayer film or sheets of thermoplastic materials are generally known, as shown for example in "Modern Plastics", August 1983 pages 22 to 26, and in "Plastic", August 1988, page A33. In both systems, between several extruders which each generates a polymer melt, and the slit die, a feedblock is located outside the die for combining the thermoplastic layers upstream of the die expansion chamber which is generally of the coathanger-type. Distributor pins, adjustable flow dividers, flaps, restrictor bars, or the like, are provided to control the thickness and distribution of the thermoplastic materials passing through metering channels and thus the thickness of each layer at the feedblock.

The feedblock, located upstream of the die, is generally accessible from all sides and is provided with means to control the different layer thicknesses of the polymer melts, but requires a specific feedblock for each desired layered structure from the standpoint of material and arrangement. The feedblock itself or significant elements thereof may therefore be replaced, and adjustments can be made for specific fluctuations and melt temperatures and/or viscosities of the individual layers which results in fluctuations in the layer structure of the final product.

Such adjustments to correct for fluctuations in temperature, viscosity, etc. will, of course, require significant experience on the part of the operator. Since the layer of thickness of each layer of polymer melt can be modified, the adjacent layers are always affected and consequently the entire layer structure is affected so that an unequivocal correction requires a very precise coordination of all existing possible corrections, a condition that poses continually higher demands on the experience of the operator as the number of layers increases. And, when extruding a multilayer sheet of a significant number of layers, the feedblock becomes continually more demanding and more costly.

Another drawback of the prior art coextrusion systems is that in the area of combining different polymers into the structure to be produced in the area of spreading the polymers into their final width and squeezing the layers to their final thickness in the coathanger die, the feedblock requires a channel of noticable length for reasons of stability. However, it has been demonstrated that not all layer structures of polymer melts necessarily flow strictly laminarly in such a channel but exhibit turbulence producing interfacial instability but cannot reform in the expansion chamber and therefore produce an undefined final product. Such a condition cannot be corrected by external adjustments made by the operator.

U.S. Pat. No. 4,619,802 discloses an extrusion apparatus which avoids some of the aforementioned drawbacks. The feed section to the feedblock is replaced by permanent channels in the die arranged in the flow direction of the polymer melt at the upstream side of the die. The feedblock, containing continuous flow channels, is removably inserted into a recess provided in the die, and the feedblock has an adjustable flow divider located between the flow channels to control the layer of thickness of the individual layers of polymer melt. Adjustment of the flow divider, however, affects both the adjoining layers of the entire layer structure.

In this prior art arrangement, the outlet of the removable feedblock is located as close as possible to the die manifold in which the layered melt stream expands in a direction parallel to the die slit while being simultaneously squeezed in a direction perpendicular thereto.

However, the drawback with this arrangement is that because of the adjustable vanes used to control the layer thickness the number of layers of the formed multilayer sheet is limited unless a multi-channel die is used. Moreover, such a coextrusion die requires a rather deep (measured in the flow direction) die in order to accommodate both a coathanger type expansion chamber, a removable feedblock and the permanent channels in the die leading from the extruders to the feed block through the rear section of the die. Moreover, the type of feedblock used is restricted in that the number and distribution of the polymer melts along the passage in the removable feedblock must be associated with the fixed feed channels at the rear section of the die.

The limitation of the number of polymer melts to be combined in the feedblock because of the means used to mechanically control the layer thicknesses, as in the prior art systems discussed above, can be avoided by the provision of a feedblock described in "Plastics Engineering", March 1974, pages 65 to 68, FIG. 3. With the feedblock method, it is possible to make a number of different layered structures by changing the feedports ahead of the single manifold die, provided that the individual extruders are sized for the desired product structure. The extruders are connected to feedblock manifolds ahead of the die. The individual manifolds introduce the various polymer melts into a feedport module which positions the polymer streams into the desired layer sequence. The combined substances are then channeled into the die.

However, combining does not take place within the die, and the feedblock has no means to mechanically control the layer distribution and thickness of the individual layers of polymer melt, such as the outer or skin layers especially when such layers are to be very thin. The outer layers are not only subjected to homogenization with the adjoining inner layers, but skin layer nonuniformity may develop due to the shear/stress exhibited between that layer and the wall of the passage through which it travels, or between the skin layer and the wall of the expansion chamber.

Another problem not addressed by the prior art is the automatic shrinkage at the sides of the laminate after extrusion through the die. Every multilayer film or sheet of polymer generated by a slit die exhibits an undesired edge deformation, which is usually eliminated by suitable trimming. In so doing, however, there is a significant accumulation of waste which should be able to be again fed to the production process of the multilayer polymer film or sheet. However, due to its composition of all layers of the product produced before, the waste can be suitably recycled only by using specific measures, as described for example in German published application 36 04 004.

SUMMARY OF THE INVENTION

It is an object of the present invention to avoid the drawbacks of the prior art by the provision of a coextrusion apparatus having a feedblock inserted in a slit die for producing uniformly distributed layers of a multilayer film or sheet of diverse thermoplastic materials. Problems with layer distribution and interfacial instability are avoided, and side encapsulation of the multilayer film or sheet may be effected in a highly reliable and efficient manner.

Another object to the present invention is to provide such an apparatus in which the feedblock comprises a plurality of slotted, layer distribution passages opening into the coathanger-type expansion chamber of the die via a shallow chamber entrance section.

A further object in this invention is to provide such an apparatus in which the feedblock has externally actuatable means for varying the cross-section of the outermost distribution passages thereof for effectively controlling the layer distribution of the skin layers of the multilayer film or sheet produced.

A still further object of the invention is to provide such an apparatus in which the feedblock assembly, which includes the slotted feedblock and associated feed channels leading from the extruders, can be removable from the die cavity.

A still further object of the invention is to provide such an apparatus which has a slit die of relatively short length avoiding the need for fixed feed channels which are otherwise provided in the feedblock assembly capable of being removed together with its slotted feedblock, or wherein the slotted feedblock alone can be easily and effectively replaced from the die cavity.

Other objects, advantages and novel features of the invention will become more apparent from the following detailed description of the invention when taken in conjunction with the accompanying drawings.

BRIEF DESCRIPTION OF THE DRAWINGS

FIG. 5 is a view similar to FIG. 1 of another embodiment of the extrusion apparatus according to the invention, taken substantially along the line 5—5 of FIG. 6;

FIG. 6 is a view taken substantially along the line 6—6 of FIG. 5;

DETAILED DESCRIPTION OF THE INVENTION

Figure 1:
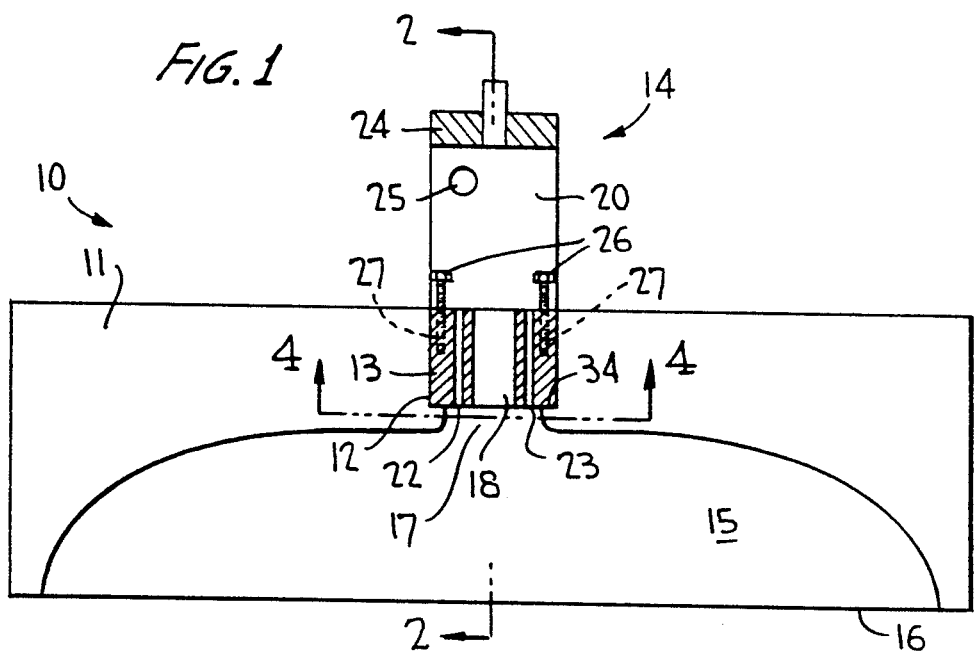
FIG. 1 is a schematic illustration of the apparatus of the invention, taken substantially along the line 1—1 of FIG. 2, the associated fee channels of the feedblock assembly being not shown for clarity.
Figure 2:
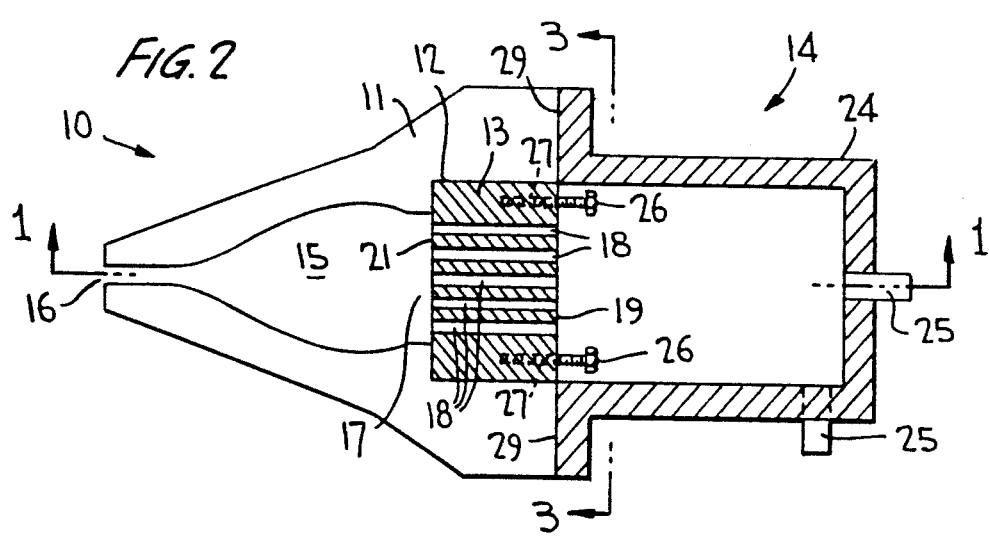
FIG. 2 is a view of the apparatus taken substantially along the line 2—2 of FIG. 1.

Turning now to the drawings wherein like reference characters refer to like and corresponding parts throughout several views, the coextrusion apparatus of the invention is generally designated 10 in FIGS. 1 and 2 as comprising a slit die 11 of two half parts interconnected together in some normal manner and each having recesses together forming a cavity 12 for the reception of a feedblock 13 forming a sub-assembly of a feedblock assembly generally designated 14.

The die has a coathanger-type expansion chamber 15 terminating in a slotted die outlet 16 defined by a pair of spaced die lips of generally known construction. And, the die has a shallow chamber entrance section 17 in communication with cavity 12.

The feedblock comprises a plurality of slotted layer distribution passages 18 in the form of mutually spaced apart slots or openings lying substantially parallel to slotted die outlet 16. The passages extend from an inlet side 19 to an outlet side 21 of the feedblock.

The feedblock further comprises end encapsulation slots 22 and 23 extending between inlet and outlet sides 19 and 21 without intersecting passages 18 and lying substantially perpendicular thereto. Otherwise, slots 22 and 23 may extend along planes converging together from side 19 to side 21, without departing from the invention. Moreover, such slots 22 and 23 could instead be located in die 11 itself adjacent the feedblock from the inlet side thereof and opening into section 17, within the scope of the invention. The feedblock assembly includes a frame 24 connected to the upstream end of the die in some suitable manner and defining a chamber 20 open on opposite sides to facilitate removal and replacement of feedblock 13 with an interchangeable feedblock designed to accommodate specific resin viscosities, selected polymer matchups, layer thickness changes, layer geometry, etc.

Frame 24 includes various connectors 25 to which extruders (not shown) of polymer melts are connected, and to which feed channels or feed lines (also not shown) are likewise connected for feeding the melts to slots 18, 22, 23, or to selected ones thereof.

The feedblock may be connected in some suitable manner to frame 24 or may be unconnected thereto. To facilitate feedblock removal, the feedblock may be provided with bores 27 for the reception of bolts 26 or the like serving as engaging elements for a manual or a machine operated grasping device. When it is desired to interchange the feedblock, it is simply removed through one of the open sides of the frame for replacement by another feedblock to facilitate a new production cycle of multilayer sheet of thermoplastic materials. During the interchangeable operation, the feed channels (not shown) within the frame are disconnected and either removed and replaced or reconnected for feeding designated slots of the feedblock for the new operation.

Figure 3:
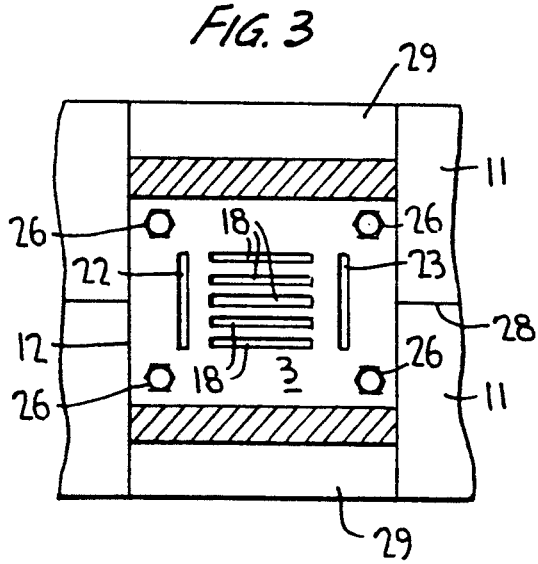
FIG. 3 is a view take substantially along the line 3—3 of FIG. 2 illustrating a top plan view of the feedblock.
Figure 4:
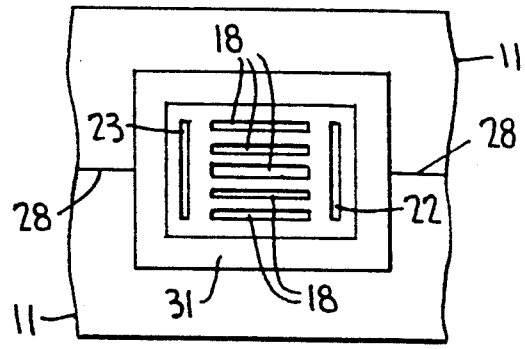
FIG. 4 is a view take substantially along the line 4—4 of FIG. 1 illustrating a bottom plan view of the feedblock in relation to the shallow chamber entrance section.

FIGS. 3 and 4 respectively illustrate the inlet and outlet sides of feedblock 13 for the polymer melts directed through slots 18, 22, 23, and show the dividing plane 28 of the die halves. And, as shown in FIG. 3, the hat-shaped frame 24 has transversely extending flanges 29 to facilitate attachment of the frame to the die. Also shown in FIG. 4 is a peripheral shoulder 31 presenting a stop for the feedblock, the shoulder being defined by the cavity 12 area and the more constricted area of chamber entrance section 17.

Another apparatus generally designated 32 according to the invention is illustrated in FIG. 5 as comprising a slit die 33 of mating die halves similar to that of apparatus 10, such that like parts will be designated by like reference numerals. A feedblock assembly, generally designated 34, is totally integrated into the die as it is inserted within a die cavity 35 open at the upstream end of the die and at opposing sides of the die, as more clearly shown in FIG. 6. Feedblock assembly 34 comprises feedblock 13, connectors 25 and melt feed lines 36 extending from the connectors for feeding plastic melts from the extruders to the slotted passages 18, 22, 23 of the feedblock. Thus, the entire feedblock assembly 34 can be removed from cavity 35 and replaced by another feedblock assembly for a new production cycle.

Feedblock 13 of apparatus 32 can be provided with externally accessible means to control the melt streams of polymer melt passing through the outermost slots 18 for adjusting the distribution of the outer or skin layers of the skin laminate to be formed. Such control means may be in the form of a restrictor bar 37 extending transversely to the direction of flow of melt through the passages for controlling the width and/or shape of the outermost passage upon manual manipulation of an adjustment screw 38. The restrictor bar may be located in a side cavity 39 of the feedblock.

Figure 7:
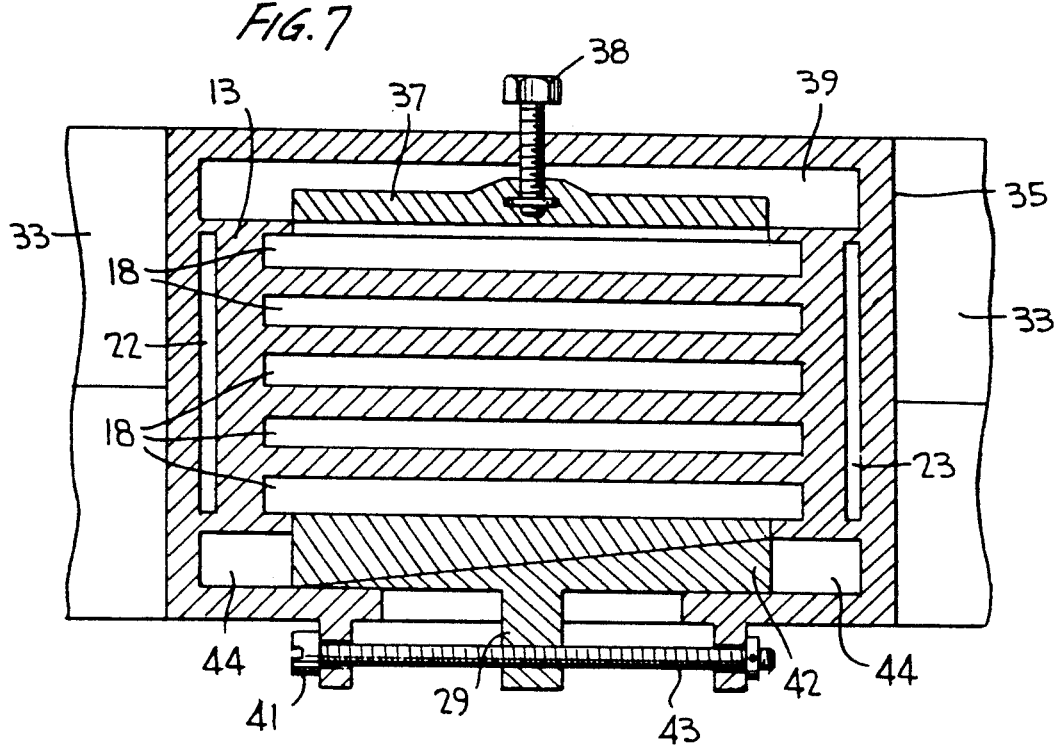
FIG. 7 is an enlarged cross-sectional view of the feedblock taken substantially along the line 7—7 of FIG. 5.

Otherwise, the skin layer control means may be in the form of a driven wedge 41 mating with a drive wedge 42 connected to a screw drive 43, as more clearly shown in FIG. 7. The wedges may be housed in a suitable side cavity 44, and a turning of screw drive 43 shifts wedge 42 along the screw drive and causes the driven wedge to be shifted transversely relative to the melt flow through the feedblock for controlling the distribution of the skin layer flowing through the outer-most passage of the feedblock.

Of course, restrictor bar 37 can be utilized on both sides of the feedblock, and the wedge arrangement can likewise be utilized on both sides, without departing from the invention. And, restrictor bar 37 and wedge 41 can have flat melt flow engaging surfaces, or these surfaces can be concavely or convexly shaped or otherwise contoured to control the layer distribution of the skin layers by modifying the outer slots to accommodate differences in melt viscosities, etc.

Figure 8:
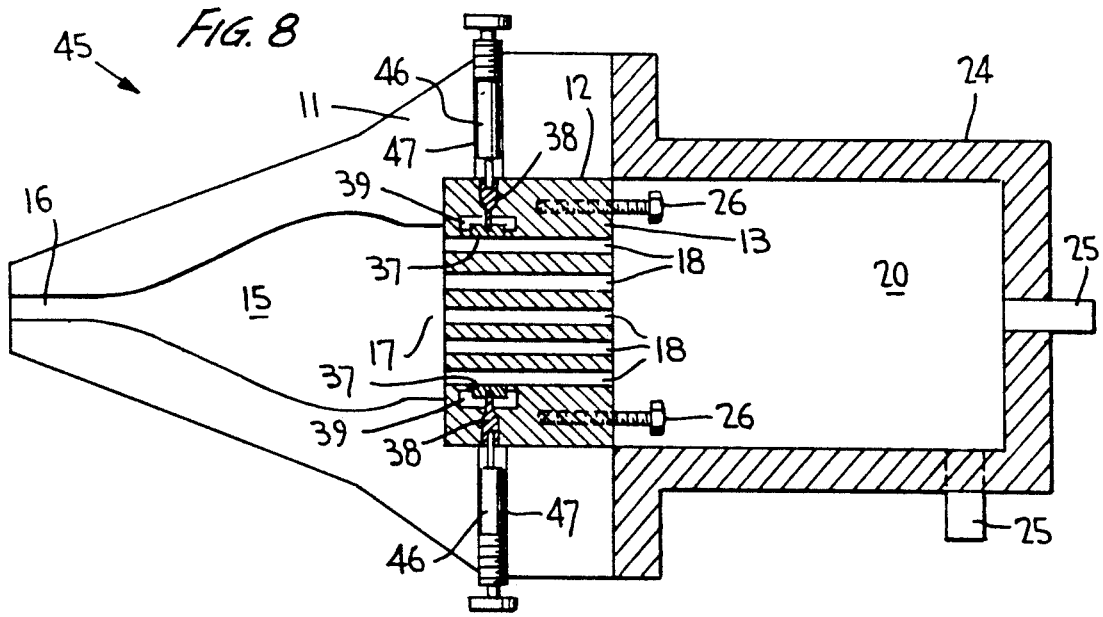
FIG. 8 is another embodiment of the invention similar to that of FIG. 2, at an enlarged scale, including external actuators for controlling the distribution of the outer or skin layers to be formed.

Apparatus 45 of the invention, shown in FIG. 8, is essentially the same as apparatus 10 shown in FIGS. 1 and 2 except for the outer layer control means similar to that described with reference to FIGS. 6 and 7. Thus, restrictor bars 37 can be provided or adjusting the flow of polymer melt through outer passages 18 of the feedblock. Manually operated adjustment rods 46 are coupled to screws 38, the rods extending through suitable transverse bores 47 located in the inlet die.

In operation, heat plastified thermoplastic resin(s) is supplied to feed lines 36 and discharged therefrom to selected passages 18 of the feedblock which is removably located within the slit die itself such that upon exiting the feedblock the melt layers are combined at chamber entrance section 17 just prior to entering expansion chamber 15 at which the laminate fills up the chamber 15 diverging outwardly and forwardly toward opposite ends of the die and extruding through die outlet 16. Thus, immediately after the polymers are configured into their targeted laminate structure at shallow section 17, the laminate immediately undergoes spreading and squeezing in expansion chamber 15. Nonuniform distribution and not easily layer instability are therefore avoided.

The feedblock is easily removable and interchangeable with another feedblock to be used for another and/or different production cycle. The replaceable feedblock can be adapted to any current slit die or to a multi-channel slit die in such a manner that its outlet is arranged as close as possible to the entrance to the coathanger-type expansion chamber. Only the feedblock 13 need be replaced as such as when the layer structure, i.e., the number, arrangement and thickness, is to remain unmodified but different resinous materials makes a modified arrangement of the slotted passages for one or several layers of polymer melt necessary or at least desirable for rheological reasons.

The feedblock is readied for removal by simply disconnecting or removing that portion of the feedblock assembly which contains the inlets connected to the extruders, and the connecting channels from these inlets to the slotted passages. The feedblock is inserted in a cavity at the upstream end of the slit die with or without the use of supporting means to install and interchange the feedblock. The feedblock may be provided with tapped bores for the reception of support rods or bolts as engaging elements for manual or machine driven grasping devices to install the feedblock into and out of the die.

The feedblock may be provided with side encapsulation slots, or such slots may be provided directly in the die itself, for sealing the edges of the multilayer film or sheet produced such that edge trimming formerly performed after the laminate is extruded through the die opening generates waste of only a single polymer component which can be readily recycled into the appropriate extruder of the entire system without any additional measures.

Externally accessible means such as restrictor bars or wedge plates may be provided for influencing the flow characteristics of the outermost layers of the multilayer film or sheets to be formed. Thus, the layer distribution of outer or skin layers can be externally controlled. Experience has shown that the reciprocal effect of the flow characteristics of the core layers of the laminate need not be taken into consideration with relative wide limits once the suitable selected parameters have been determined. However, due to the interaction of the outermost layers both with adjacent melt layers and with a wall area of the die and/or feedblock, the outermost layers can exhibit greater irregularities and flow characteristics that make a direct post adjustment desirable.

Obviously, many modifications and variations of the Present invention are made possible in the light of the above teachings. It is therefore to be understood that within the scope of the appended claims the invention may be practiced otherwise than as specifically described.

What is claimed is:

1. A coextrusion apparatus for producing a multilayer film or sheet of diverse thermoplastic materials, comprising:

a slit die having a slotted outlet lying in a given plane through which a layered melt stream of the materials are extruded as a multilayer film or sheet, said die having a coathanger-type expansion chamber with a shallow chamber entrance section having an entrance end, and an outwardly open feedblock cavity in direct communication with said section;

said die having a feedblock assembly comprising a removable feedblock received within said cavity, said feedblock having downstream and upstream ends and comprising a plurality of slotted, layer distribution passages opening into said expansion chamber via said shallow chamber entrance section, said downstream end of said feedblock lying in a plane in common with a plane containing said entrance end of said entrance section, said passages comprising mutually spaced apart openings lying parallel to said plane of said slotted outlet of said die, said openings being of substantially rectangular cross-section of equal width between said downstream and upstream ends, said opening including inner layer core openings and outermost skin layer openings of a predetermined cross-section, at least said inner openings being of fixed dimensions, and said feedblock assembly comprising a plurality of feed lines for conveying flow of thermoplastic melt materials to selected ones of said passages, said feedblock assembly further comprising externally actuatable means located between said downstream and upstream ends of said feedblock and adjustable in a direction perpendicular to said plane of said slotted outlet of said die for varying the cross-section of said outermost skin layer openings, whereby the flow of materials are distributed as layers by said feedblock, the layers being formed into a layered melt stream at said entrance section, and said layered melt stream undergoing immediate transverse spreading in said expansion chamber before being extruded through said die outlet.

2. The apparatus according to claim 1, wherein one of said die and said feedblock has slotted end encapsulation passages connected to said feed lines for forming end melt stream perpendicular to said slotted outlet of said die for sealing side ends of the layered melt stream, said end encapsulation passages being spaced from opposing ends of said distribution passages and opening into said shallow section.

3. The apparatus according to claim 2, wherein said end encapsulation passages are located in said feedblock and lie perpendicular to said plane of said slotted outlet of said die.

4. The apparatus according to claim 1, wherein said cavity is open at an end of said die opposite said slotted outlet, and said cavity is open at opposing sides of said die.

5. The apparatus according to claim 1, wherein said means comprises restrictor bars.

6. The apparats according to claim 1, wherein said means comprises a pair of cooperating wedges, an outer one of said wedges being manually adjustable in a direction transverse to said plane of said slotted outlet of said die for shifting an inner one of said wedges in a direction perpendicular to said plane of said slotted outlet of said die.

7. The apparatus according to claim 1, wherein said feedblock assembly further comprises a frame having an open chamber in communication with said cavity, said frame having opposing open sides and connectable to said die.

8. The apparatus according to claim 7, wherein said feedblock has bores in an outer face thereof for the reception of lift rods to facilitate removal of said feedblock from said cavity through one of said open sides of said frame.

* * * * *